Sept. 21, 1965 SHIZUHIKO TANIGAWA ETAL 3,207,517

MAGNETIC RECORDING AND REPRODUCING APPARATUS

Filed Dec. 27, 1962 8 Sheets-Sheet 1

INVENTORS
Shizuhiko Tanigawa
Yoshio Yabuno
Shozo Aratani
Masao Nakata
By Stevens, Davis, Miller & Mosher
ATTORNEYS INVENTORS
Shizuhiko Tanigawa
Yoshio Yabuno
Shozo Aratani
Masao Nakata
By Stevens, Davis, Miller & Mosher
ATTORNEYS

MAGNETIC RECORDING AND REPRODUCING APPARATUS

Filed Dec. 27, 1962 8 Sheets-Sheet 3

INVENTORS
Shizuhiko Tanigawa
Yoshio Yabuno
Shozo Aratani
Masao Nakata
ATTORNEYS

MAGNETIC RECORDING AND REPRODUCING APPARATUS

Filed Dec. 27, 1962 8 Sheets-Sheet 4

INVENTORS
Shizuhiko Tanigawa
Yoshio Yabuno
Shozo Aratani
Masao Nakata
By Stevens, Davis, Miller & Mosher
ATTORNEYS

MAGNETIC RECORDING AND REPRODUCING APPARATUS

Filed Dec. 27, 1962 8 Sheets-Sheet 5

INVENTORS
Shizuhiko Tanigawa
Yoshio Yabuno
Shozo Aratani
Masao Nakata
By Stevens, Davis, Miller + Mosher
ATTORNEYS.

MAGNETIC RECORDING AND REPRODUCING APPARATUS

Filed Dec. 27, 1962

INVENTORS
Shizuhiko Tanigawa
Yoshio Yabuno
Shozo Aratani
Masao Nakata
By Stevens, Davis, Miller + Mosher
ATTORNEYS

MAGNETIC RECORDING AND REPRODUCING APPARATUS

Filed Dec. 27, 1962

INVENTORS
Shizuhiko Tanigawa
Yoshio Yabuno
Shozo Aratani
Masao Nakata
By Stevens, Davis, Miller & Mosher
ATTORNEYS Sept. 21, 1965 SHIZUHIKO TANIGAWA ETAL 3,207,517

MAGNETIC RECORDING AND REPRODUCING APPARATUS

Filed Dec. 27, 1962 8 Sheets-Sheet 8

INVENTORS
Shizuhiko Tanigawa
Yoshio Yabuno
Shozo Aratani
Masao Nakata
By Stevens, Davis, Miller & Mosher
ATTORNEYS 3,207,517

MAGNETIC RECORDING AND REPRODUCING APPARATUS

Shizuhiko Tanigawa, Moriguchi-shi, Yoshio Yabuno, Toyonaka-shi, and Shozo Aratani and Masao Nakata, Osaka, Japan, assignors to Matsushita Electric Industrial Co., Ltd., Osaka, Japan, a corporation of Japan Filed Dec. 27, 1962, Ser. No. 247,746
Claims priority, application Japan, Dec. 29, 1961, 36/65,394, 36/65,395; June 8, 1962, 37/24,089; Nov. 16, 1962, 37/68,890, 37/68,891; Nov. 30, 1962, 37/72,619, 37/72,620, 37/72,621, 37/72,622
12 Claims. (Cl. 274—4)

The present invention relates generally to mechanisms used in magnetic recording and reproducing systems and particularly to rotary head mechanisms of magnetic tape video recording and reproducing systems.

One of previously well-known systems of recording and reproducing television images is adapted to record electrical signals corresponding to the television images directly on a magnetic tape and to reproduce when desired said electric signals to produce the television images on a television screen.

In previous methods, in which television signals or other signals of extremely high frequencies or having an extremely wide frequency band are recorded directly on a magnetic tape such as used conventionally in magnetic sound recording, it has been necessary to use an extremely high relative speed between the gap of the recording or reproducing head and the magnetic medium moving past the gap in order to enable the reproduction of the high-frequency components of the recorded signals. One of the methods followed to meet this requirement is the so-called Ampex system, in which a rotary disc carries four recording heads. In this system, the recording heads are mechanically rotated by the rotary disc transversely of the magnetic tape at a substantially high speed to obtain the required relative speed between the tape and the recording heads. In more detail, the tape moves past said heads in the longitudinal direction at a speed of 15 inches per second and the signals are recorded on the tape as a series of transverse lines or tracks. With this method, the rotary disc is rotated at the speed of 14,400 r.p.m. and includes a tape guide covering the disc along a peripheral portion thereof extending through an angle of approximately 100 degrees with a tape of two-inch width interposed therebetween.

An improvement over the above method has included an arrangement such that the heads operate to scan the tape surface diagonally thereof. In this arrangement, the tape extends about a fixed cylindrical tape-guiding drum along the entire periphery or half the periphery thereof, said rotary video-recording head being mounted in said tape-guiding drum. The path of the tape thus runs diagonally relative to the tape-guiding drum so that diagonal tracks are recorded on the tape. In this case, however, it is difficult to mount on the drum a rotary disc having one of two magnetic heads. To meet this difficulty it has been proposed and put into practice, for example, to divide the tape-guiding drum into an upper and a lower section separated by a groove, in which the rotary disc is arranged.

In view of these deficiencies met in the prior art, the present invention has for its primary object to provide an improved rotary head structure for use in a magnetic recording and reproducing apparatus comprised of a rotary disc including one or more magnetic heads for use with a magnetic tape.

Another object of the invention is to provide a magnetic recording and reproducing apparatus of the character described which includes a rotary disc formed along its periphery with recesses in which segments are detachably fitted.

A further object of the invention is to provide a magnetic recording and reproducing apparatus of the character described which comprises a rotary disc formed along its periphery with recesses in which segments each carrying a magnetic head are detachably fitted.

A still further object of the invention is to provide a magnetic recording and reproducing apparatus comprising a rotary disc structure including a tape-guiding member, a rotary disc detachably fitted to the tape-guiding member and having along the peripheral edge recessed portions to which segments are detachably fitted.

Yet another object of the invention is to provide a magnetic recording and reproducing apparatus of the character described comprising a rotary disc structure including a rotary disc formed along the peripheral edge thereof with recessed portions and segments adjustably fitted to said recessed portions by way of respective adjusting mechanisms or movable segments fitted to said recessed portion by hinge means.

Another object of the invention is to provide a magnetic recording and reproducing apparatus having a rotary disc structure including: a rotary disc formed with a recessed groove extending diametrally across the surface thereof and formed along the periphery with recessed portions at opposite ends of said recessed groove; and head-mounting bases each carrying a magnetic head and detachably fitted to the associated recessed portion.

A further object of the invention is to provide a magnetic recording and reproducing apparatus comprising a rotary disc structure including: a tape-guiding member; a rotary disc detachably fitted to the tape-guiding member and having a first recess taking the form of a groove extending diametrally across the disc to the periphery of the disc and second recesses formed along the peripheral edge of the disc; first segments each taking the form of a head-mounting base carrying a magnetic head and detachably fitted in said first recess; and second segments detachably fitted in said second recesses.

A still further object of the invention is to provide a magnetic recording and reproducing apparatus of the character described comprising a rotary disc structure including: a rotary disc having a first recess taking the form of a groove extending diametrally across the surface of the rotary disc, and second recesses formed along the peripheral edge of the disc at opposite ends of said groove; first segments each comprised of a head-mounting base carrying a magnetic head; and second segments detachably fitted in said second recesses and each formed in the surface with a third recess of the same cross-sectional configuration as that of the first recess and in alignment therewith; said first segments each being fitted to the associated second segment along the peripheral edge thereof and at the extremity of said third recess formed in the second segment.

Another object of the invention is to provide a magnetic recording and reproducing apparatus of the character described in which the first and third recesses may be formed by a single machining operation to define a groove extending diametrally across the surfaces of the rotary disc and the second segments, after the second segments have been fitted in the second recesses formed in the rotary disc along the peripheral edge thereof.

Yet another object of the invention is to provide a magnetic recording and reproducing apparatus of the character described in which one of the side walls of said recessed groove serves as a plane of reference for positioning the head-mounting bases each carrying a magnetic head in said groove and which further comprises means for clamping the head mounting bases against said side wall as a plane of reference after the bases have been fitted in said groove.

Another object of the invention is to provide a magnetic recording and reproducing apparatus of the character described having a plane of reference extending parallel to a diameter of the rotary disc, said first and second recesses in the rotary disc being formed by a single machining operation employing said plane of reference as a datum.

A still another object of the invention is to provide a magnetic recording and reproducing apparatus of the character described comprising head-mounting bases each formed with a medial groove for receiving a magnetic head unit and carrying terminal plugs connected to the coil of the magnetic head unit and adjusting screws extending through the opposite side walls of the medial groove to engage the magnetic head unit received therein, whereby the magnetic head unit may be adjusted in position in said groove.

A further object of the invention is to provide a magnetic recording and reproducing apparatus comprising a rotary disc carying at least one magnetic head and partly recessed along the peripheral edge so that the disc may be detachably fitted to the tape-guiding member.

These and other objects, advantages and features of the present invention will become apparent from the following description when taken in conjunction with the accompanying drawings, which schematically illustrate some preferred embodiments of the invention and in which.

Figure 1:
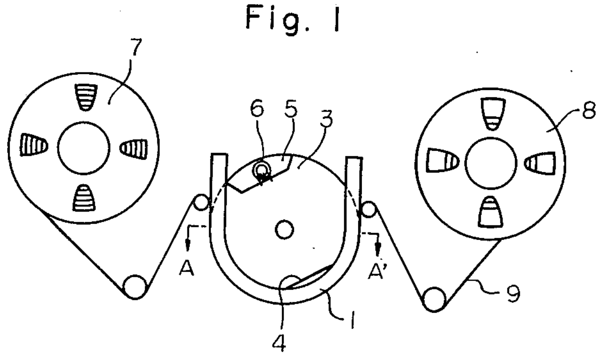
FIG. 1 is a schematic plan view of a magnetic recording and reproducing apparatus having a rotary head disc according to the invention.

The magnetic recording and reproducing apparatus according to the present invention has a rotary head structure including a rotary disc having peripheral recesses and segments fitted therein said rotary disc being detachably mounted on a tape-guiding member, as illustrated in the drawings.

In contrast to this, the conventional magnetic recording and reproducing system will first be described in further detail for the better understanding of the present invention. Some typical examples of the conventional system briefly described hereinbefore will be described below. This system, in which the heads scan the tape diagonally thereof, is disclosed in substantial detail in the 1960 December issue of the Journal of the SMPTE, pages 868 to 871, and only the basic features of the system will be described herein.

Figure 28:
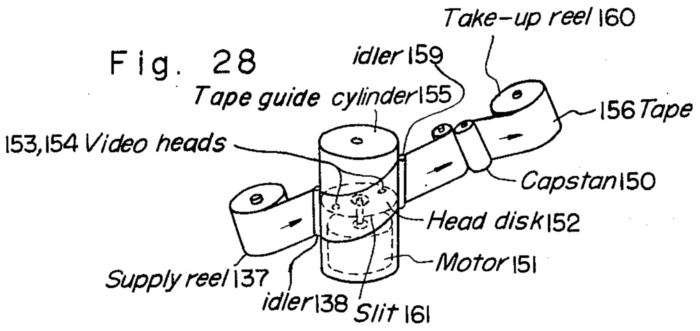
FIG. 28 is an explanatory diagram illustrating a conventional wide-band video signal recording and reproducing apparatus having a cylindrical tape-guiding member.

The system employs an arrangement as shown in FIG. 28 and includes a synchronous motor 151 provided for driving a head disc 152 having two video heads 153 and 154 mounted therein at a speed of rotation of 1800 r.p.m. These components are all accommodated in a tape-guide cylinder 155 having a circumferential slit 161, through which the tips of the video heads 153 and 154 extend outwardly.

A magnetic tape 156 is drawn from a supply reel 137 to run over a first idler roller 138 to the tape-guide cylinder 155. After passing over half the periphery of the cylinder, the tape runs over a second idler roller 159 and through a capstan drive 150 to be wound about a take-up reel 160. While the tape 156 moves around the tape-guide cylinder 155 over half the periphery thereof, it is linearly scanned by two video heads 153 and 154, which are mounted on the rotary head disc 152 along the periphery thereof in diametrically opposite relation to each other, and thus televsision signals are recorded on the tape.

Figure 2:
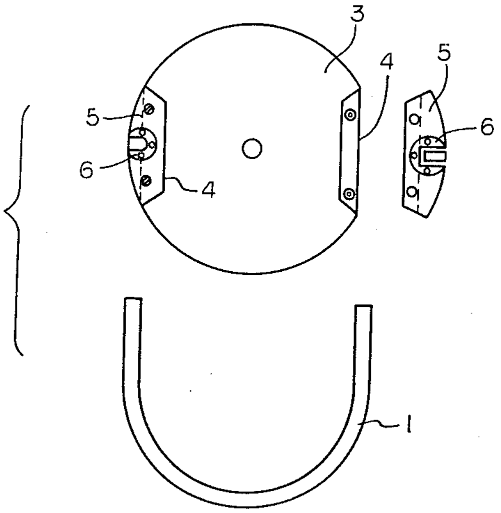
FIG. 2 is an exploded plan view of the rotary head structure shown in FIG: 1.

In this system, since the rotary head disc 152 has an outer diameter larger than the inner diameter of the tape-guide cylinder 155, it is extremely difficult to arrange the rotary head disc 152 so that the outer periphery of the disc may be placed in its normal position in the slit 161 in the tape-guide cylinder 155. To overcome this difficulty, some attempts have been made: one of them has been to divide the tape-guide cylinder along the plane of the slit into two sections, which are assembled into an integral tape-guide cylinder with the rotary head disc interposed between the sections; and another attempt has been to employ a U-shaped tape-guiding structure as illustrated in FIG. 2, the open end of the structure being expandable to allow the rotary head disc to be inserted therein. The former attempt, however, has involved some deficiencies including the danger of the upper and lower tape-guiding surfaces of the cylinder assembly have a dimensional inconformity therebetween, the need of a higher accuracy in the mounting of the tape guide to reduce the dimensional error, and the increase in dimensions and weights of the tape-guide members. Also, the latter attempt has involved the danger that the tape guide, which is required to have a high accuracy, be deformed. Further, where the rotary head disc has a reduced diameter so that only the magnetic heads project through the slit in the cylinder beyond the exterior surface of the tape guide, there has occurred a danger that the magnetic tape be caught into the slit in areas other than engaging with the magnetic heads and thus readily damaged.

In addition, the system described above has included two magnetic heads mounted on a rotary disc along the periphery thereof at angular intervals of 180 degrees. However, it has generally been very difficult to arrange a number of magnetic head units along the periphery of a rotary disc at predetermined angular intervals.

The present invention is intended to provide a magnetic recording and reproducing apparatus having a rotary head disc free of the aforementioned deficiencies met in the prior art.

Figure 3:
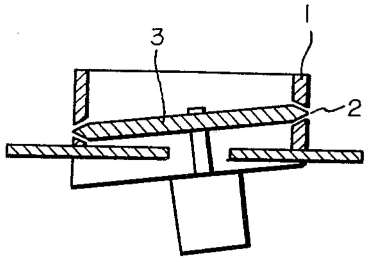
FIG. 3 is a cross-sectional view taken along the line A—A' in FIG. 1.

Referring particularly to FIGS. 1 to 3, reference numeral 1 indicates a U- or ∩-shaped tape guide including a semicircular portion and straight leg portions with a slit 2 formed in the semicircular portion. Reference numeral 3 indicates a rotary head disc having diametrically opposite recessed portions 4, 4 along the periphery thereof, the diametral distance between the recessed portions 4, 4 of the rotary head disc 3 by screws and carry-tape guide 1 with the peripheral edge of the disc presenting itself to the slit 2 formed in the tape guide 1. Segments, 5, 5 are detachably fitted to the respective recessed portions 4, 4 of the rotary head disc 3 by screws and carrying respective magnetic heads 6, 6. A tape supply reel 7 and a tape take-up reel 8 are arranged so that a magnetic tape 9 from the supply reel 7 travels along the tape guide 1 to the take-up reel 8 while the rotary head disc 3 is rotated at a predetermined speed relative to the tape 9.

In inserting the rotary head disc 3 into the slit 2 formed in the tape guide 1, it is first placed inside of the tape guide 1 with segments 5, 5 carrying respective magnetic heads 6, 6 removed from the disc, and then the segments 5, 5 are screwed to the rotary head 3 to complete the circular configuration thereof so that the peripheral edge of the disc presents itself to the slit 2 formed in the tape guide.

Though two segments have been shown in the above embodiment, any suitable number of segments may be employed when desired, as will readily be understood.

Figure 4:
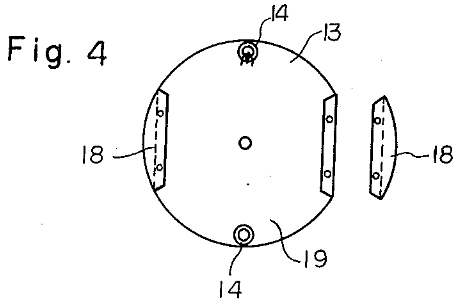
FIG. 4 is a plan view of a modified form of the rotary head disc according to the invention.
Figure 5:
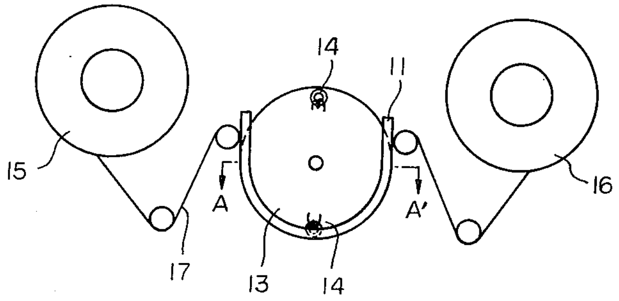
FIG. 5 is a plan view of a magnetic recording and reproducing apparatus employing the rotary head disc shown in FIG. 4 showing the arrangement of essential parts.

Referring next to FIGS. 4 and 5, reference numeral 11 indicates a U- or ∩-shaped tape guide having a slit formed therein and reference numberal 13 a rotary head guide carrying magnetic heads 14 with the peripheral edge presenting itself to the slit formed in the tape guide 11. A tape supply reel 15 and a tape take-up reel 16 are arranged so that a magnetic tape 17 from the supply reel 15 travels along the tape guide 11 to the take-up reel 16 while the rotary head disc 13 is rotated at a predetermined speed relative to the tape 17.

The body 19 of the rotary head disc 13 is recessed along the peripheral edge thereof with segments 18, 18 detachably screwed to the respective recessed portion of the disc body 19.

In inserting the rotary head disc 13 into the slit formed in the tape guide 11, the disc body 19 with the segments 18, 18 removed therefrom is first placed inside of the tape guide 11 and then the segments 18, 18 are screwed to the disc body to complete the circular rotary head disc having its peripheral edge presenting itself into the slit formed in the tape guide 11.

Though in the embodiment just described two segments are provided, any suitable number of such segments may be employed in accordance with the formation of the tape guide, as will be understood.

Figure 6:
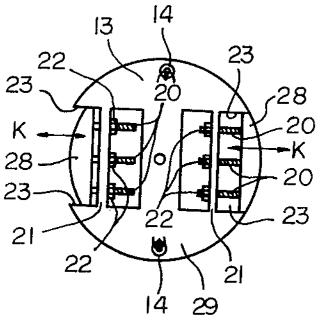
FIG. 6 is a plan view of a further form of the rotary head disc constructed according to the present invention and carrying adjusting elements.
Figure 7:
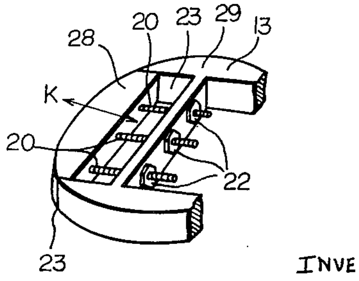
FIG. 7 is a perspective view of the rotary head disc shown in FIG. 6 with portions cut away to clearly illustrate the adjusting mechanism.

A further embodiment of the present invention will next be described with reference to FIGS. 5 to 7.

A rotary disc 13 in this embodiment is comprised of a disc body 29 recessed along the periphery thereof and adjustable segments 28, 28 fitted to the respective recessed portions of the disc body 29. A number of threaded bolts 20 are firmly secured to each of the adjustable segments 28, 28 and are in adjustable engagement with respective nut members 22 extending through one of two bridge formations 21, 21 formed on the disc body 19, as illustrated. It will be observed that the adjustable segments 28, 28 are each slidable in the direction indicated by the double arrow K radially along the surface 23 of the disc body 29 by adjusting the nut members 22.

In inserting the rotary head disc 13 into the slit formed in the tape guide 11, the nuts 22 are first adjusted to move the adjustable segments 28, 28 radially inwardly to make the outer diameter of the disc smaller than the inner diameter of the tape guide 11 and then the disc 13 with its diameter reduced is placed inside of the tape guide 11 so that the peripheral edge of the rotary head disc 13 may be inserted into the slit formed in the tape guide 11. With the disc thus positioned, the nuts 22 are again adjusted this time so as to advance the adjustable segments 28 into the slit thereby simultaneously completing the circular configuration of the rotary head disc 12 with is peripheral edge presenting itself into the slit. It will be apprent that also in this embodiment, the number of adjustable segments 28 may be suitably selected in accordance with the configuration of the tape guide other than two as illustrated.

Figure 8:
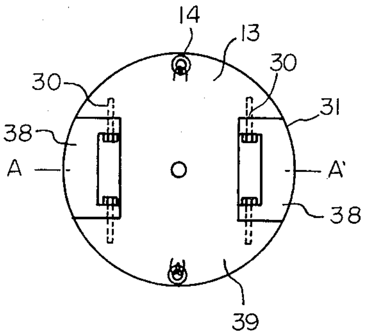
FIG. 8 is a top plan view of a further form of the rotary head disc carrying movable segments according to the present invention.
Figure 9:
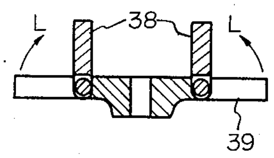
FIG. 9 is a cross-sectional view taken along the line A—A' in FIG. 8.

FIGS. 8 and 9 illustrate a modification of the structure shown in FIGS. 6 and 7, which will now be described in connection with the arrangement of FIG. 5.

The rotary disc 13 in this form is comprised of a disc body 39 recessed along its periphery and movable segments 38, 38, each of which is pivotally or hingedly mounted in the associated recess formed in the disc body by means of pivot studs 30. The movable segments 38, 38 may thus be turned in the direction of the arrow L from their normal position flush with the disc to the raised position as shown in FIG. 9.

In inserting the rotary head disc 13 into the slit formed in the tape guide 11, the movable segments 38 are first turned away from the face of the disc body 39 to their raised position to make the outer diameter of the disc smaller than the inner diameter of the tape guide 11 and then the rotary head disc 13 is brought to the inside of the tape guide 11 so that the peripheral edge of the disc 13 is inserted into the slit formed in the tape guide 11. Thereafter, the rotary head disc 13 is turned in its plane so that one of the recessed portions of the disc body 39 is directed to the open end of the U-shaped tape guide 11 to allow the movable segments 38, 38 to be restored to and fixed in their normal position to again complete the circular configuration of the rotary head disc 13. In this position, the peripheral edge of the rotary head disc 13 presents itself into the slit formed in the tape guide.

Figure 10:
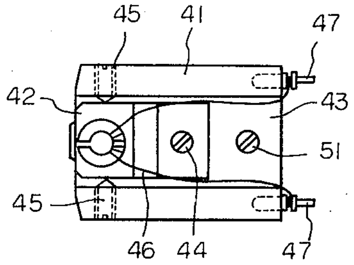
FIG. 10 is a plan view of a head-mounting base carrying a magnetic head according to the invention.
Figure 11:
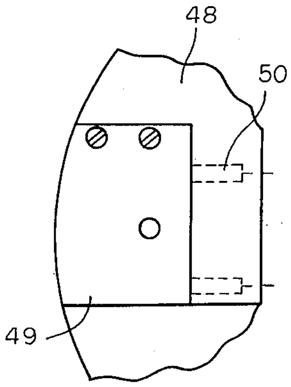
FIG. 11 is a top plan view of the head-mounting base shown in FIG. 10 as fitted to a rotary disc.

A further embodiment of the present invention will now be described with reference to FIGS. 10 to 13. Referring particularly to FIGS. 10 and 11, a rectangular head-mounting base 41 has a groove 43 formed medially thereof to receive a head unit 42, which is firmly secured to the base 41 by a fixing screw 44 provided for the purpose.

Adjusting screws 45 are provided on the head-mounting base for the adjustment of the head unit, one for each side wall of the groove 43, and are engageable at the extremity with the head unit 42 on the opposite sides thereof.

Lead wires 46 from the head unit 42 are secured to respective plugs 47 provided on the head-mounting base 41 to cooperate with respective sockets 50 arranged in a groove 49 formed in a rotary disc 48.

Figure 12:
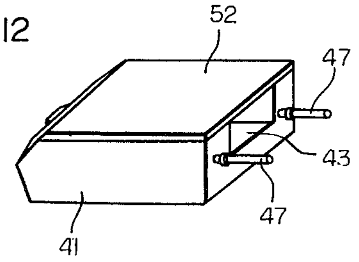
FIG. 12 is a perspective view of the head-mounting base shown in FIG. 10.

A screw 51 is provided for affixing the head-mounting base 41 to the rotary disc 48. Also, a cover 52 is secured to the head-mounting base 41 as illustrated in FIG. 12.

Figure 13:
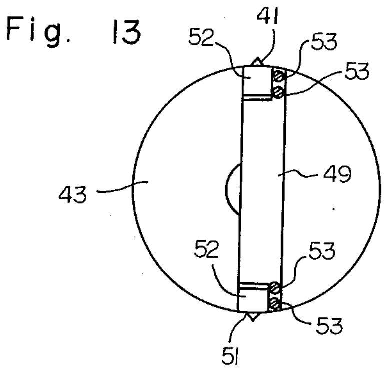
FIG. 13 is a top plan view of a rotary disc having a recessed groove according to the present invention and carrying head-mounting bases.

FIG. 13 illustrates the head-mounting bases 41 as fitted in the groove 49 formed in the rotary disc 48. The groove 49 extends diametrally of the rotary disc 48 one of the side walls of which serves as a reference available in securing the head-mounting bases 41 in place by means of wedge-shaped fixing screws 53 with the plugs 47 on each of the head-mounting bases 41 fitted in the associated sockets 50 arranged in the groove 49.

A still further embodiment of the invention will be described with reference to FIGS. 14 to 16, in which reference numeral 61 indicates a U-shaped tape guide having a slit 62 formed therein, and reference numeral 63 indicates a rotaary head disc formed with a first recess 65 in the form of a groove extending diametrally across the surface of the disc to reach at opposite ends to the peripheral edge thereof and a pair of second recessed portions 64, 64 formed along the peripheral edge of the disc, the diametral distance between the recessed portions 64, 64 being smaller than the inner diameter of the tape guide 61. The rotary head disc 63 is arranged so that its peripheral edge presents itself into the slit 62 in the tape guide, as clearly shown in FIG. 16. Segments 66, 66 are detachably secured to the recessed portions 64, 64 of the rotary head disc 63 by means of screws or by other suitable means. A pair of head-mounting bases 67, 67 each carry a magnetic head and are secured in said first recess 65. A tape supply reel 68 and a tape take-up reel 69 are arranged so that a magnetic tape 70 from the supply reel 68 travels along the tape guide 61 to the take-up reel 69 while the rotary head disc 63 is rotated at a predetermined speed relative to the tape 70.

Figure 15:
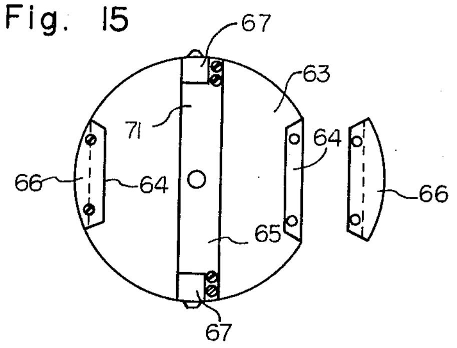
FIG. 15 is a top plan view of the rotary disc shown in FIG. 14 with head-mounting bases and segments fitted thereto.

Incidentally, the first and second recesses 65 and 64 are formed in parallel to each other, as clearly shown in FIG. 15, but it is not necessary that they are positioned relative to each other in the particular arrangement illustrated. Also, though in this embodiment a single first recess 65 and two second recesses 64 are provided, any suitable number may be selected either for the first or second recesses when desired, as will readily be understood. It is evident that the parallel arrangement of the first and second recesses 65 and 64 as illustrated clearly in FIG. 15 is included in the scope of the present invention.

Figure 14:
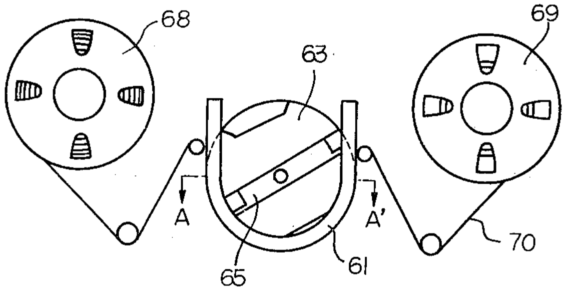
FIG. 14 is a plan view of another arrangement of the magnetic recording and reproducing apparatus according to the present invention including a rotary disc having a recessed groove and peripheral recesses and also head-mounting bases.
Figure 16:
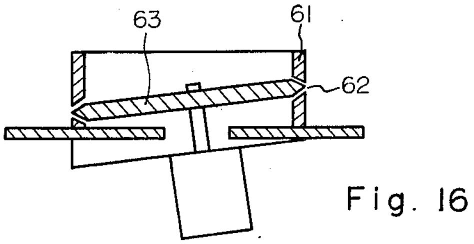
FIG. 16 is a cross-sectional view taken along the line A—A' in FIG. 14.
Figure 17:
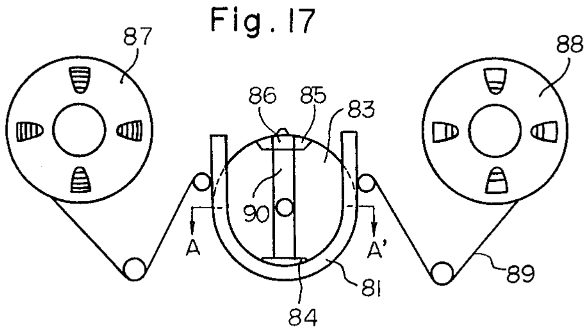
FIG. 17 is a modification of the arrangement shown in FIG. 14.
Figure 18:
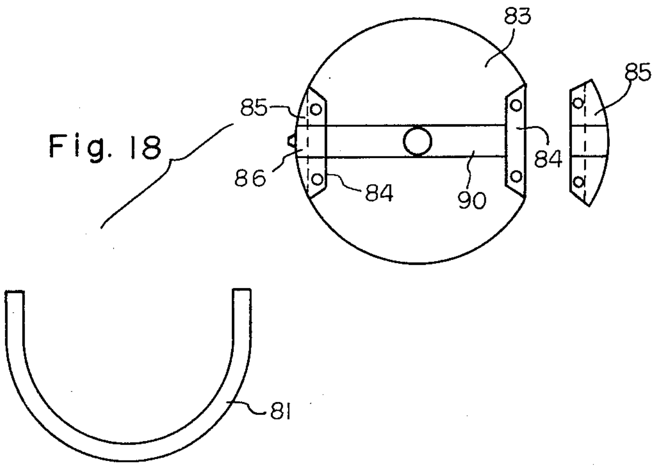
FIG. 18 is an exploded plan view of the rotary head structure shown in FIG. 17.
Figures 19, 20:
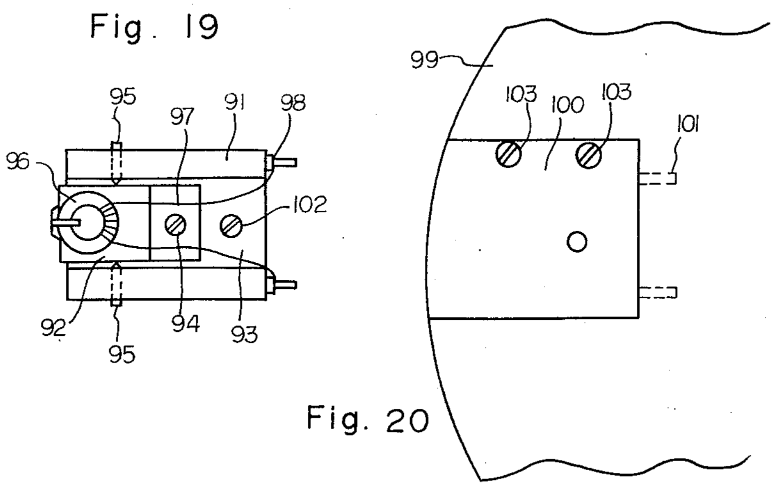
FIG. 19 is a top plan view of a further form of the head-mounting base carrying a magnetic head according to the present invention.
FIG. 20 is a top plan view of the head-mounting base shown in FIG. 19 as fitted to a rotary disc.
Figure 21:
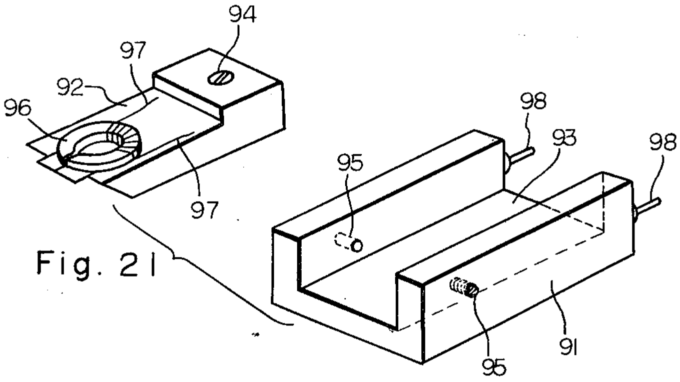
FIG. 21 is an exploded perspective view of the head-mounting base shown in FIG. 19.

FIGS. 17 and 18 illustrate a modification of the apparatus shown in FIGS. 14 to 16. In this modification, a U-shaped tape guide 81 includes a semicircular portion and straight leg portions with a slit formed in the semicircular portion. A rotary head disc 83 is formed along the periphery with a pair of diametrally opposite recessed positions 84, 84, which are spaced from each other by a ditsance smaller than the inner diameter of the tape guide 81. The rotary head disc is arranged so that the peripheral edge thereof presents itself into the slit in the tape guide. A first recess 90 is formed in the disc in a manner so that magnetic heads 86, 86 may be secured firmly thereto. Segments 85, 85 carrying respective magnetic heads 86, 86 are detachably fitted to the respective recessed portions 84, 84 forming "second" recesses of the rotary head disc 83 as by screw means. A tape supply reel 87 and a tape take-up reel 88 are arranged so that a magnetic tape 89 from the supply reel 87 travels along the tape guide 81 to the take-up reel 88 with the rotation of the rotary head disc 83 at a predetermined speed relative to the take 89.

In order to insert the rotary head disc 83 into the slit of the tape guide 81, the rotary head disc 83 with the segments 85, 85 carrying respective magnetic heads 86, 86 removed from the disc is brought to the inside of the tape guide 81 and then the segments 85, 85 are screwed to the rotary head disc 83 to complete the circular configuration thereof with the peripheral edge of the circular disc presenting itself into the slit formed in the tape guide 81. It is noted that the first recess 90 for securing magnetic heads 86, 86 therein is extended into the segments 85, 85 and has a uniform cross-sectional configuration throughout its entire length extending across the surface of the disc itself and the segments 85, 85 thereon so that when the segments 85, 85 have been fitted to the disc 83 a continuous groove is formed across the entire surface of the disc assembly. Though in the above embodiment two segments are shown, the number of such segments may be suitably varied when desired according to the configuration of the tape guide as will be readily understood.

An example of the head-mounting base usable with the apparatus of the invention will now be described in detail with reference to FIGS. 19 to 22. The rectangular head-mounting base 91 is formed medially thereof with a groove 93, in which a head unit 92 is arranged in fixed relation to the head-mounting base 91 by means of a fixing screw 94 provided for the purpose.

Screws 95 are arranged on the head-mounting base for adjustment of the head unit mounted thereon and are fitted in the opposite side walls of the groove 93 formed in the head-mounting base 91 with their extremities engaging the head unit 92 on the opposite sides thereof.

The head unit 92 includes a head coil 96 from which lead wires 97 extend to respective plugs 98 arranged at one end of head-mounting base 91 for cooperation with sockets 101, which are arranged in one end of a groove 100 formed in the rotary disc 99 for receiving the head-mounting base 91. A screw 102 is provided for securing the head-mounting base 91 to the rotary disc 99.

Figure 22:
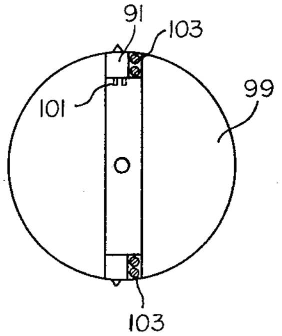
FIG. 22 is a top plan view of a rotary disc carrying the head-mounting bases as shown in FIG. 19.

FIG. 22 illustrates the manner in which the head-mounting base 91 is arranged in the groove 100 formed in the rotary disc 99.

In this connection, it is noted that the head-mounting base 91 fitted in the groove 100 formed diametrally of the rotary disc 99 is secured in place by wedge-shaped fixing screws 103 employing one of the side walls of the groove 100 as a plane of reference while at the same time fitting the plugs 98 on the head-mounting base 91 into the sockets 101 arranged in the groove 100.

Figure 23:
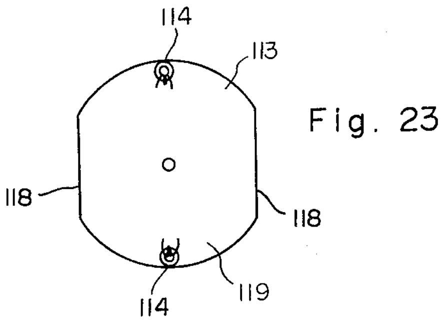
FIG. 23 is a top plan view of a rotary head disc having recesses along its peripheral edge according to the present invention.
Figure 24:
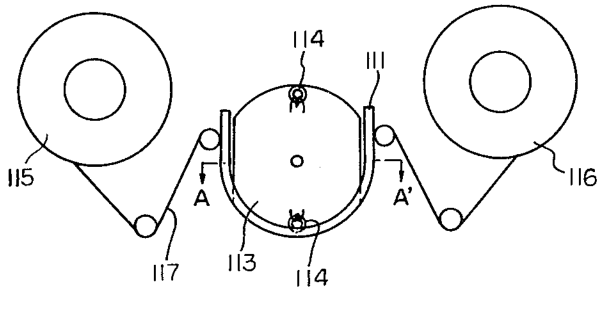
FIG. 24 is a plan view of a magnetic recording and reproducing apparatus having the rotary head disc shown in FIG. 23.

A further embodiment of the present invention will next be described with reference to FIGS. 23 and 24, in which a rotary disc 113 is shown formed along its peripheral edge with recessed portions 118.

In inserting the rotary head disc 113 into the slit formed in the U-shaped tape guide 111, the disc 113 is placed inside of the tape guide 111 with the recessed portions 118 aligned with the opposite ends of the minimum diameter of the tape guide 111 so that the peripheral edge of the disc presents itself into the slit formed in the tape guide 111.

Though also in this embodiment two segments are employed, any desired number of such segments may be selected, including one, in accordance with the configuration of the tape guide. Also, the recessed portions may each have any suitable configuration.

Figure 25:
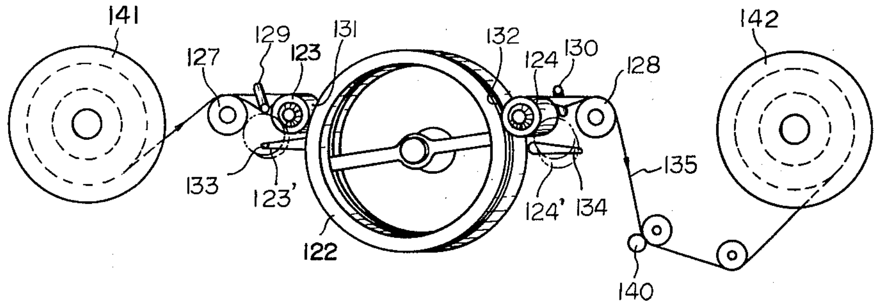
FIG. 25 is a plan view of another arrangement of the magnetic recording and reproducing apparatus including a rotary head structure according to the present invention.
Figure 26:
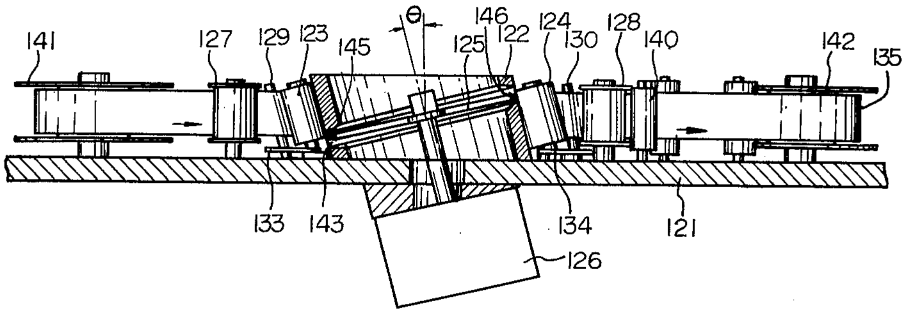
FIG. 26 is a front view, partly in section, of the apparatus shown in FIG. 25.
Figure 27:
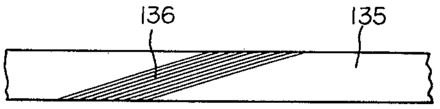
FIG. 27 illustrates tracks recorded on a magnetic tape by the apparatus shown in FIGS. 25 and 26.

In the foregoing description, only the principal features of the magnetic recording and reproducing apparatus according to the present invention have been introduced, and now a specific embodiment of the present invention and particularly its rotary head disc will be described in detail with reference to FIGS. 25 to 27. At the first, the tape-guiding structure and the rotary head disc of the embodiment will be specifically described.

An electric motor 126 is employed which is of the four-pole hysteresis synchronance type and rotates at the speed of 1800 r.p.m. when supplied from a commercial alternating-current source of 60 cycles per second and 117 volts. As illustrated the shaft of the motor is arranged relative to the base plate 121 at an angle, $\theta$, of approximately 5° 21′ to the normal thereto and carries a rotary head disc or drum 125 of 220 mm. diameter, which in turn carries two magnetic heads 145, 146 about the periphery thereof. The tips of the magnetic heads 145, 146 each have a thickness of 250 $\mu$m. and a gap of 2.5 $\mu$m., and when the disc 125 is rotated by said motor 126 is rotated at a speed of 20 meters per second. The magnetic tape 135 employed with this embodiment is a video tape as commonly called and has a width of one inch and a thickness of 37.5 $\mu$m. A capstan drive 140 is provided to drive the tape at a speed 15 inches per second so that straight diagonal tracks 136 are recorded on the magnetic tape 135. The tracks 136 each have a width of 250 $\mu$m. and a length of approximately 353 mm., being spaced from the adjacent tracks by a distance of 125 $\mu$m. The peripheral edge of the rotary head disc 125, which is rotated while being held in contact with the magnetic tape 135, extends substantially at right angles to the path of tape travel extending away from the disc 125. The disc periphery also rotates in alignment with a groove 143 of about one millimeter width formed in an ∩-shaped tape-guiding structure and having an angular extent of approximately 100 degrees. It is to be understood that the tips of the magnetic heads 145, 146 extend outwardly through the groove 143 so as to be rotatable while being held in contact with the tape. It will be noted that the rotary head disc 125 should be mounted inside of an ∩-shaped or cylindrical tape-guiding structure as indicated at 122.

The tape-guiding structure 122 has an ∩-shaped guiding face of approximately 42 mm. width and approximately 6 mm. thickness including a sliding surface for the tape width of one inch. The tape-guiding face also includes an effective recording section extending semicircularly or over the angular range of 180 degrees about the periphery of the tape-guiding face according to the scanning system including two magnetic heads. In practice, however, the tape path extends in contact with the guiding face about 20 degrees in excess on opposite sides of the recording section thereof corresponding to the overlap at opposite ends of the tracks recorded on the tape. Thus, the tape-guiding face has a tape-engaging periphery having an angular extent of approximately 220 degrees and is formed with a groove extending diagonally of the face for the purpose of allowing the tips of the magnetic heads to project outwardly through the groove.

To fit the rotary head disc 125 into the ∩-shaped tape-guiding structure 122 through its opening, some measure has to be taken to deal with the thickness of the guiding face. According to the present invention, the rotary head disc is partly cut away to reduce its size relative to the inner diameter of the guiding face by an amount corresponding to the thickness thereof for facilitating the assembling of the disc. Actually, the disc is formed with two diametrally opposite recessed portions each having a peripheral extent of 70 mm.

The magnetic head units are mounted on the rotary disc along its periphery in precisely diametrally opposite relation or at angular intervals of 180 degrees. With such arrangement, it has previously been difficult to remove and replace the magnetic head units when their tips have worn out. According to one feature of the present invention this difficulty is overcome in the following manner. A grooved recess is formed diametrally in the rotary disc which extends across the entire surface thereof and has a length of 220 mm., a width of 16 mm. and a depth of 6 mm., one of the side walls of the groove serving as a plane of reference parallel to a disc diameter as a line of reference. A head-mounting base is fitted in each end of the groove, which carries a magnetic head unit, the head-mounting base having a length of 20 mm., a width of 16 mm. and a height of 6 mm. In fitting the head-mounting base, the said plane of reference is made use of as a reference. To this end, it is designed so that the spacing between the side wall as the plane of reference and the disc diameter as the line of reference is precisely equal to half the transverse width of the head-mounting base.

The head-mounting base includes adjusting screws so that the magnetic head unit fitted in the base is freely adjustable in position in a direction circumferential of the rotary disc carrying the tips of the magnetic heads within a range of adjustment of 1 mm. Since this adjustment is effected before the head-mounting base is fitted to the rotary disc, no further adjustment is required once the base has been fitted to the disc upon the basis of the reference plane of the rotary disc.

The procedure of fabricating the rotary disc, having two types of recesses including peripheral recesses and a diametral groove, will now be described.

The rotary disc is made in two typical forms; one including the two types of recesses extending parallel to each other and the other including those intersecting each other. The former form includes, as illustrated in FIG. 15, a straight groove 65 and peripheral recesses 64 extending parallel thereto. In fabrication of this form of rotary disc, a diametral line 71 is selected as a line of reference and a plane of reference is set parallel to the line of reference so that the groove 65 and peripheral recesses 64 are simultaneously machined utilizing the plane of reference as a datum. On the other hand, with the latter form of rotary disc, as illustrated in FIG. 18, the peripheral recesses 84 are first machined and, after the segments 85 have been fitted thereto, a straight groove 90 is machined at right angles to the peripheral recesses 84 and across the surfaces of the rotary disc 83 itself and the segments 85 fitted in the peripheral recesses 84.

While particular embodiments of the present invention have been shown and described, it is apparent that changes and modifications may be made without departing from the invention in its broader aspects. The aim of the appended claims, therefore, is to cover all such changes and modifications as fall within the scope of the invention.

What is claimed is:

1. A magnetic recording and reproducing apparatus comprising a supply reel; a take-up reel; a tape-guide member; tape having a predetermined width disposed about said supply reel, said tape-guide member, and said take-up reel in such a way that said tape defines a portion of a cylinder about said tape guide member and the longitudinal center of said tape is disposed in a single plane, said tape-guide member having the cylindrical portion thereof extending through an angle of at least about 180 degrees; a rotary disk having at least one magnetic head mounted substantially at the periphery thereof; means for rotating said disk in a plane disposed at a predetermined angle to the central axis of said cylindrical portion; said guide member defining a slit, a portion of which is contiguous to said tape and extending at least from one point contiguous to one transverse limit of said tape to another point contiguous to the other transverse limit of said tape; said disk disposed at least partially within said slit for continuously scanning said tape; and means for longitudinally moving said tape from said supply reel to said take-up reel; said rotary disk being partially recessed along its peripheral edge so as to be detachably fitted to said tape-guide member; the diameter of said disk being greater than the inner diameter of said cylindrical portion of the tape-guide member; said rotary disk comprising at least one segment detachably fitted thereto at the partially recessed portion thereof.

2. A magnetic recording and reproducing apparatus according to claim 1, wherein said segment includes said magnetic head.

3. A magnetic recording and reproducing apparatus as claimed in claim 2, including a rotary head having at least one magnetic head characterized in that said rotary disk comprises at least one head-mounting base including a medial groove formed therein to receive a magnetic head unit, terminal plugs connected to the coil of the magnetic head unit and adjusting screws extending through the sidewalls of said medial groove so that the leading end of each of said screws engages said magnetic head unit, and the position of said magnetic head unit is adjustable by said adjusting screws.

4. A magnetic recording and reproducing apparatus according to claim 1, wherein said rotary disk comprises at least one adjustable segment fitted thereto at the partially recessed portion thereof through an adjusting means, the fitted position of said segment being adjustable.

5. A magnetic recording and reproducing apparatus according to claim 1, wherein said rotary disk comprises at least one movable segment mounted in the partially recessed portion thereof by way of hinge means.

6. A magnetic recording and reproducing apparatus comprising a supply reel; a take-up reel; a tape-guide member; tape having a predetermined width disposed about said supply reel, said tape-guide member, and said take-up reel in such a way that said tape defines a portion of a cylinder about said tape-guide member and the longitudinal center of said tape is disposed in a single plane; said tape-guide member having the cylindrical portion thereof extending through an angle of at least about 180 degrees; a rotary disk having at least one magnetic head mounted substantially at the periphery thereof; means for rotating said disk in a plane disposed at a predetermined angle to the central axis of said cylindrical portion; said guide member defining a slit, a portion of which is contiguous to said tape and extending at least from one point contiguous to one transverse limit of said tape to another point contiguous to the other transverse limit of said tape; said disk disposed at least partially within said slit for continuously scanning said tape and means for longitudinally moving said tape from said supply reel to said take-up reel; the diameter of said rotary disk being greater than the inner diameter of said cylindrical portion of the tape-guide member; said rotary disk being provided with a first recess in the form of a groove extending diametrically across the disk surface and terminating at opposite ends in the outer periphery thereof and at least one second recess partially formed along the peripheral edge thereof so as to be detachably fitted to said tape-guide member; said rotary disk comprising at least one first segment detachably fitted to said first recess at the opposite ends thereof and including a head-mounting base carrying said magnetic head and at least one second segment detachably fitted to said second recess partially formed along the peripheral edge of the disk.

7. A magnetic recording and reproducing apparatus according to claim 6, wherein said first recess comprises a plane of reference used for mounting said magnetic head in position and said first and second recesses extend parallel to each other.

8. A magnetic recording and reproducing apparatus comprising a supply reel; a take-up reel; a tape-guide member; tape having a predetermined width disposed about said supply reel, said tape-guide member, and said take-up reel in such a way that said tape defines a portion of a cylinder about said tape guide-member and the longitudinal center of said tape is disposed in a single plane; said tape-guide member having the cylindrical portion thereof extending through an angle of at least about 180 degrees; a rotary disk having at least one magnetic head mounted substantially at the periphery thereof; means for rotating said disk in a plane disposed at a predetermined angle to the central axis of said cylindrical portion, said guide member defining a slit, a portion of which is contiguous to said tape and extending at least from one point contiguous to one transverse limit of said tape to another point contiguous to the other transverse limit of said tape; said disk disposed at least partially within said slit for continuously scanning said tape and means for longitudinally moving said tape from said supply reel to said take-up reel; the diameter of said rotary disk being greater than the inner diameter of said cylindrical portion of the tape-guide member; said rotary disk being provided with a first recess in the form of a groove extending diametrically across the disk surface and at least one second recess extending along the peripheral edge thereof and at opposite ends of said groove so as to be detachably fitted to said tape-guide member, said rotary disk comprising at least one segment fitted in said second recess and formed with a third recess in the form of a groove extending across the surface of the segment to the peripheral edge thereof and having the same cross-sectional configuration as said first recess; and further at least one segment detachably fitted in said third recess at the extremities thereof and including a head-mounting base carrying said magnetic head.

9. A magnetic recording and reproducing apparatus comprising a supply reel; a take-up reel; a tape-guide member; tape having a predetermined width disposed about said supply reel, said tape-guide member, and said take-up reel in such a way that said tape defines a portion of a cylinder about said tape-guide member and the longitudinal center of said tape is disposed in a single plane; said tape-guide member having the cylindrical portion thereof extending through an angle of at least about 180 degrees; a rotary disk having at least one magnetic head mounted substantially at the periphery thereof; means for rotating said disk in a plane disposed at a predetermined angle to the central axis of said cylindrical portion; said guide member defining a slit, a portion of which is contiguous to said tape and extending at least from one point contiguous to one transverse limit of said tape to another point contiguous to the other transverse limit of said tape; said disk disposed at least partially within said slit for continuously scanning said tape and means for longitudinally moving said tape from said supply reel to said take-up reel, said rotary disk being provided with a recess in the form of a groove extending diametrically across the disk surface and terminating at opposite ends in the outer periphery thereof; said rotary disk comprising at least one head-mounting base carrying said magnetic base and detachably fitted in a recess formed along the peripheral edge of the disk at the opposite ends of said groove; one of the sidewalls of said groove serving as a plane of reference used for mounting said head-mounting base in said groove in position and means for clamping said head-mounting base against the sidewall of said groove serving as said plane of reference.

10. A magnetic recording and reproducing apparatus including a tape-guide member, a magnetic tape being in movable contact with said tape-guide member, a rotary disk detachably fitted to said tape-guide member having a first recess in the form of a groove extending diametrically across the surface of the disk and second recesses extending along the peripheral edge of said disk and at opposite ends of said groove, segments fitted in said second recesses and each formed with a third recess in the form of a groove extending across the surface of the associated segment to the peripheral edge thereof and having the same cross-sectional configuration as said first recess, and further segments detachably fitted in said third recess at the extremities thereof and each including a head-mounting base, and a magnetic head carried by each said base.

11. A magnetic recording and reproducing apparatus including a tape-guiding member, a magnetic tape in movable contact with said tape-guiding member, a rotary head comprising a rotary disk formed with a recess in the form of a groove extending diametrically across the disk surface and terminating at opposite ends at the outer periphery thereof, said disk also being provided with a peripheral recess at opposite ends of said groove, and head-mounting bases carrying respective magnetic heads detachably fitted in said respective peripheral recesses, said rotary disk being positioned contiguous said tape-guiding member and adapted to scan said magnetic tape as said tape moves on said tape-guiding member, said groove having at least one sidewall adapted to serve as a plane of reference for use in positioning the head-mounting bases in said groove, and said apparatus further comprising means for clamping the head-mounting bases against the sidewall of said groove serving as a plane of reference.

12. A magnetic recording and reproducing apparatus including a tape-guiding member, a magnetic tape movably contacting said tape-guiding member, a rotary disk positioned contiguous said tape-guiding member and adapted to scan said magnetic tape when the latter is moving, said rotary disk having recessed portions formed along its periphery with segments carrying respective magnetic heads detachably fitted to said respective portions, said segments including head-mounting bases, each base including a medial groove having sidewalls formed therein to receive a magnetic head unit having a coil, terminal plugs connected to the coil of the magnetic head unit and adjusting screws fitted to the sidewalls of said medial groove so as to engage the inner extremities of said magnetic head unit when fitted in said groove for adjustably positioning the magnetic head unit therein.

References Cited by the Examiner

UNITED STATES PATENTS

| | | | |
|---|---|---|---|
| 2,773,120 | 12/56 | Masterson | 274—4 |
| 3,020,359 | 10/57 | Pfast | 179—100.2 |
| 3,144,521 | 11/60 | Kihara | 179—100.2 |
| 3,002,706 | 10/61 | Flan | 274—11 |
| 3,080,169 | 3/63 | Lyon | 274—11 |
| 3,107,280 | 10/63 | Suetsugu | 178—6.6 |

FOREIGN PATENTS

| | | |
|---|---|---|
| 892,365 | 3/62 | Great Britain. |
| 897,654 | 5/62 | Great Britain. |
| 909,047 | 10/62 | Great Britain. |

NORTON ANSHER, *Primary Examiner.*

EVON C. BLUNK, *Examiner.*